United States Patent
Krohne et al.

(10) Patent No.: US 10,144,126 B2
(45) Date of Patent: Dec. 4, 2018

(54) ROBOT SYSTEM AND METHOD OF OPERATING A ROBOT SYSTEM

(71) Applicant: Airbus Operations GmbH, Hamburg (DE)

(72) Inventors: Ingo Krohne, Hamburg (DE); Robert Alexander Goehlich, Hamburg (DE); Yoshiyasu Hirano, Tokyo (JP); Yuichiro Aoki, Tokyo (JP); Yutaka Iwahori, Tokyo (JP); Atsushi Kanda, Tokyo (JP)

(73) Assignee: Airbus Operations GmbH (DE)

( * ) Notice: Subject to any disclaimer, the term of this patent is extended or adjusted under 35 U.S.C. 154(b) by 70 days.

(21) Appl. No.: 15/245,787

(22) Filed: Aug. 24, 2016

(65) Prior Publication Data
US 2017/0057080 A1 Mar. 2, 2017

(30) Foreign Application Priority Data
Aug. 26, 2015 (EP) .................... 15182606

(51) Int. Cl.
*B25J 9/00* (2006.01)
*B25J 11/00* (2006.01)
(Continued)

(52) U.S. Cl.
CPC .......... *B25J 9/0084* (2013.01); *B25J 9/1682* (2013.01); *B25J 11/005* (2013.01);
(Continued)

(58) Field of Classification Search
CPC ...... B25J 9/0084; B25J 9/1682; B25J 11/005; B25J 11/0075; B25J 15/04; B64F 5/10
See application file for complete search history.

(56) References Cited

U.S. PATENT DOCUMENTS

| | | |
|---|---|---|
| 4,967,947 A | 11/1990 | Sarh |
| 2003/0208302 A1 | 11/2003 | Lemelson et al. |

(Continued)

FOREIGN PATENT DOCUMENTS

EP    2 617 536 A1    7/2013

OTHER PUBLICATIONS

EP 15182606.2 Extended European Search Report dated Mar. 9, 2016.

*Primary Examiner* — Abby Y Lin
(74) *Attorney, Agent, or Firm* — Lerner, David, Littenberg, Krumholz & Mentlik, LLP

(57) ABSTRACT

A robot system for carrying out a plurality of operations during assembly or maintenance of an aircraft or spacecraft includes a first robot having a base portion, a movable robot arm having a first coupling portion, and a first control means for controlling the robot arm, a plurality of second robots having movement means, a drive portion operable to drive the movement means, a tool portion having a tool for carrying out a specific one of the operations, a second coupling portion adapted to be selectively and releasably coupled with the first coupling portion in a predetermined positional relationship, and a second control means for controlling the respective second robot. The first and second control means are adapted to control the drive portion of one of the second robots and the robot arm to couple the first coupling portion and the respective second coupling portion in the predetermined positional relationship.

18 Claims, 10 Drawing Sheets

(51) Int. Cl.
*B64F 5/10* (2017.01)
*B25J 9/16* (2006.01)
*B25J 15/04* (2006.01)

(52) U.S. Cl.
CPC ........... *B25J 11/0075* (2013.01); *B25J 15/04* (2013.01); *B64F 5/10* (2017.01)

(56) References Cited

U.S. PATENT DOCUMENTS

| | | | |
|---|---|---|---|
| 2010/0217437 A1* | 8/2010 | Sarh ....................... | B25J 9/0084 700/248 |
| 2013/0152397 A1* | 6/2013 | Oberoi .................. | B64F 5/0009 29/897.2 |
| 2016/0243702 A1* | 8/2016 | Crothers ................. | B25J 9/009 |
| 2017/0106924 A1* | 4/2017 | Hafenrichter ........ | B62D 57/032 |

* cited by examiner

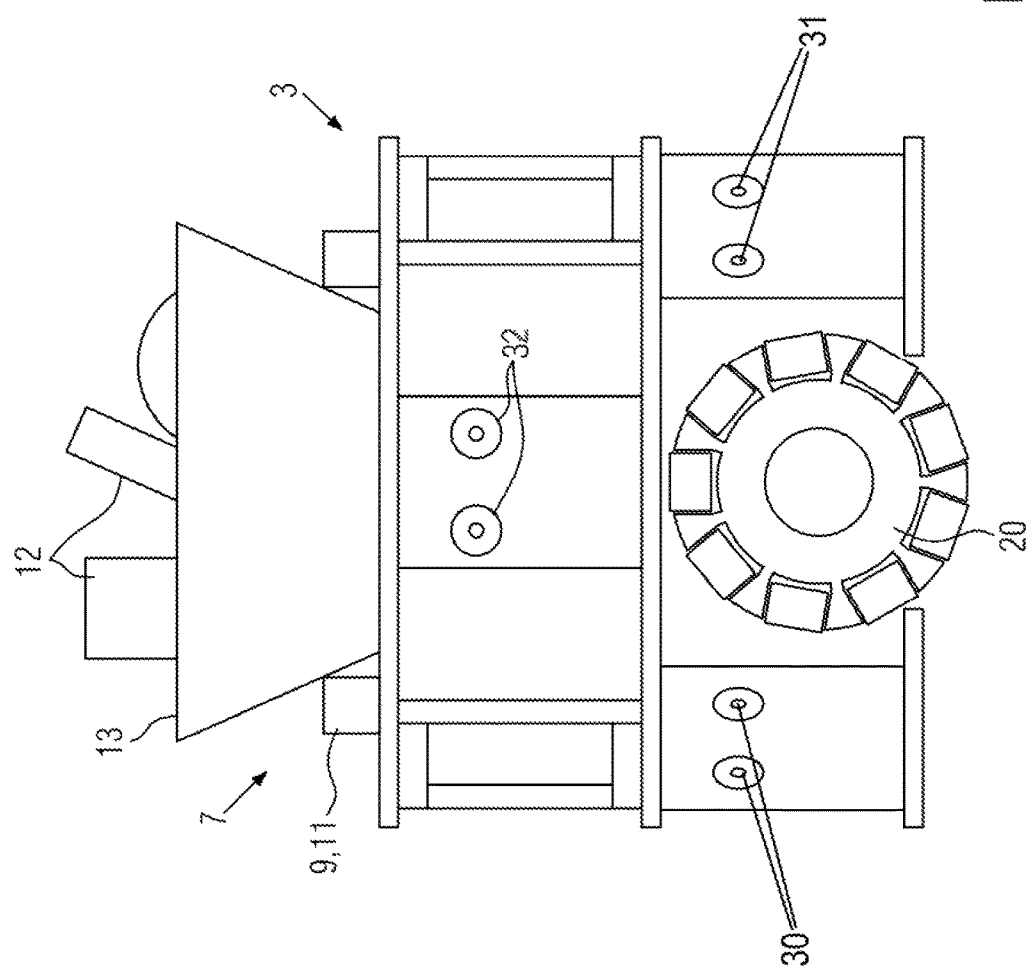

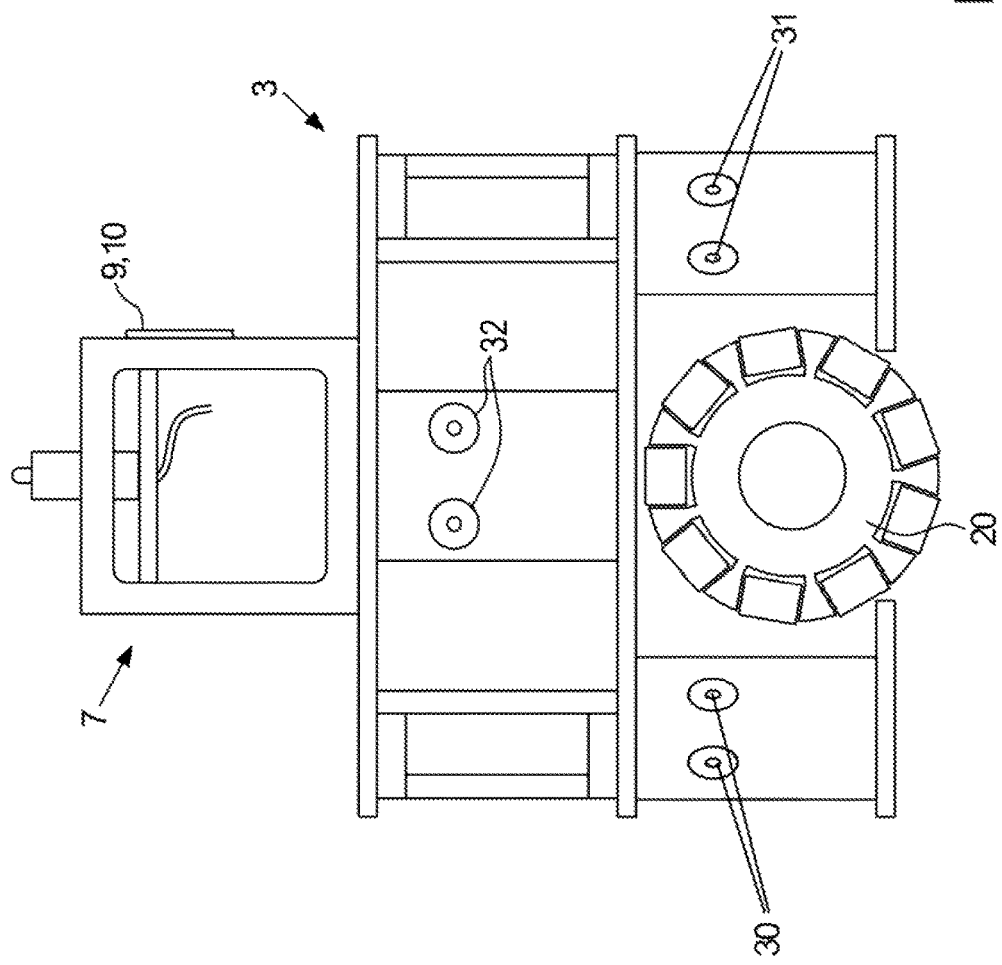

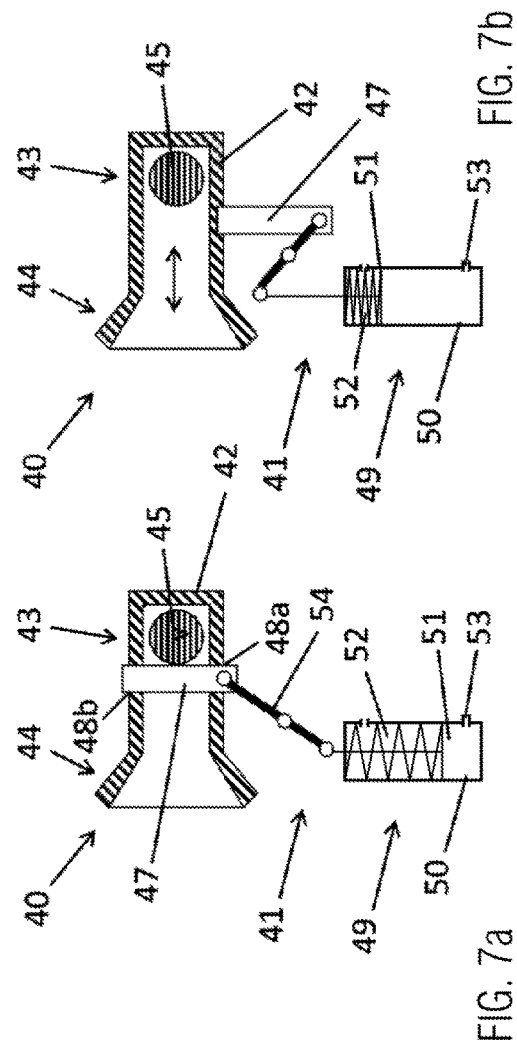

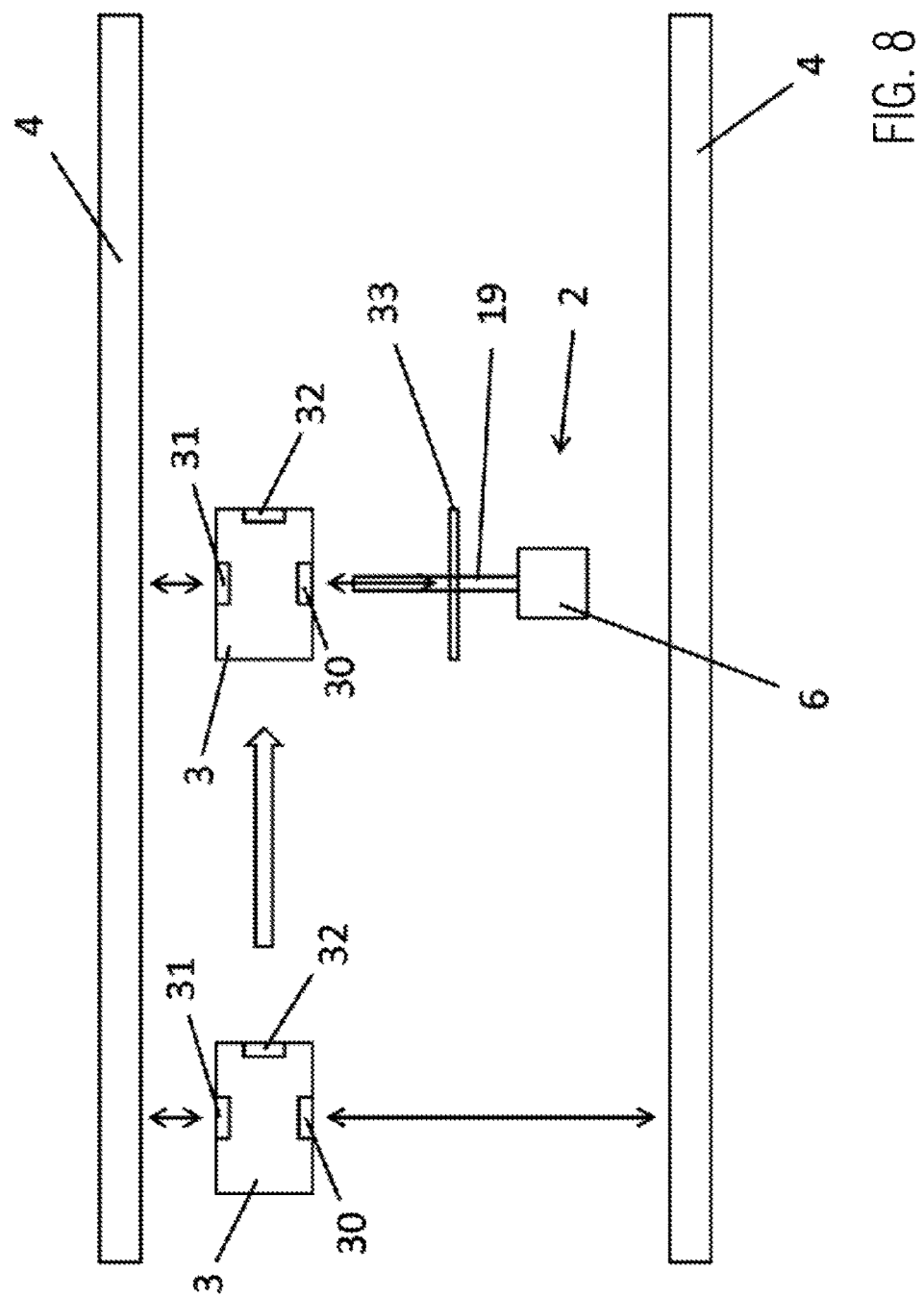

ROBOT SYSTEM AND METHOD OF OPERATING A ROBOT SYSTEM

FIELD OF THE INVENTION

The present application relates to a robot system for carrying out a plurality of operations during assembly or maintenance of an aircraft or spacecraft, comprising a robot adapted to be positioned in proximity of a fuselage of an aircraft or spacecraft and comprising a base portion, a movable robot arm connected at one end to the base portion and having at an opposite end a first coupling portion, and a first control means adapted to control the robot arm.

BACKGROUND OF THE INVENTION

Robot systems comprising one or more robots are widely utilized in different fields of technology in order to carry out work that cannot be efficiently carried out by humans or which is impossible to carry out for humans. For complex tasks, such as, e.g., the manufacturing of an aircraft or spacecraft, many different working operations have to be carried out, so that a robot having multiple different tools for carrying out the different working operations or being able to move through the working environment to get the respective tool required for a particular working operation has to be provided. However, in particular in working environments with a limited space, such as inside the fuselage of an aircraft or spacecraft, there may not be sufficient room for a big robot having multiple tools or moving through the working environment. Further, big robots having multiple tools may be relatively inflexible with regard to an adaptation to different working operations, and in limited space environments big robots moving through the working environment may pose a danger to human technicians working alongside the robot.

Nevertheless, it is strongly desired to make use of robot systems also in such environments, because otherwise, in fields such as aircraft or spacecraft manufacturing requiring highly skilled technicians, these technicians must also perform plenty of simple tasks, such as, e.g., walking out of and into the fuselage in order to get or return a required tool, searching for and getting appropriate material or preparing surfaces for a subsequent working step, as well as a lot of unergonomic tasks, such as, e.g., overhead work with heavy tools or other tasks requiring ergonomically unfavourable body postures, such as bent-over or kneeling positions, in particular when working on areas which are difficult to access. Also, the working environment itself may sometimes be uncomfortable due to, e.g., very high or very low temperatures, high humidity, intensive noise and/or vibrations. One example is a space environment, in which humans are operating under conditions very different from the ground, and low gravity and protective suits makes it difficult for the humans to control and carry out body movement. All of the above puts high demands on a technician to perform high quality tasks with a required high precision, in particular when a heavy tool must be used.

BRIEF SUMMARY OF THE INVENTION

An aspect of the present invention may provide a flexible and relatively inexpensive robot system which can also be used efficiently and safely in environments with limited space.

According to an embodiment of the present invention, a robot system for carrying out a plurality of operations during assembly or maintenance of an aircraft or spacecraft, in particular inside a fuselage of the aircraft or spacecraft, is provided. The aircraft may be, e.g., an airplane, a drone or a helicopter, and the spacecraft may be, e.g., a carrier rocket, a booster, a spaceship, a satellite, a space structure, or a space station, and assembly and maintenance also includes the associated logistics.

The robot system comprises a first robot which is adapted to be positioned in proximity of a fuselage of an aircraft or spacecraft. The first robot is preferably an industrial robot or another type robot having relatively large dimensions. It may be movable or preferably stationary, so that it can be arranged, in particular, at a variable or fixed location inside the fuselage of an aircraft or spacecraft. The first robot comprises a movable or stationary base portion, a movable robot arm connected at one end to the base portion and having at an opposite end a first coupling portion, and a first control means adapted to control the robot arm and in particular the movement thereof. Within the meaning of the present description positioning the first robot in proximity of a fuselage means that the robot arm is able to reach the fuselage with a second robot mounted thereto, as explained in detail below. The first control means may comprise one or more control units, which may take the form, e.g., of one or more processing units, each comprising one or more processors. Such processing units may further include memory storing control instructions to be executed by one or more of the processors or may be adapted to receive such control instructions from an external entity via a wired or wireless data interface.

The robot system further comprises a plurality of second robots which are movable and which are smaller than the first robot. Each of the second robots comprises movement means, which are or comprise preferably wheels, and which allow the respective second robot to be supported on a ground surface and allow translational movement of the second robot along the ground surface and rotary motion about an axis perpendicular to the ground surface, preferably about a central axis of the second robot. A drive portion of the respective second robot, which may advantageously be an electric motor, is operable to drive the movement means to effect the translational movement of the respective second robot. Optionally and preferably the drive portion may also be operable to drive the movement means to effect the rotary movement. However, it is also possible that the second robot is only passively capable of the rotary movement, i.e., by moving the second robot using external means, such as the first coupling portion during coupling of the first and second robots as described in detail below. In the latter case the second robot may advantageously comprise braking means which are operable to selectively prevent translational movement, so that when using external means to change the rotational orientation of the second robot its translational position can be fixed.

Each of the second robots further comprises a tool portion having a tool adapted to carry out a specific operation of the plurality of operations. The tool may have a fixed position with respect to the second robot, so that the tool can only be moved into a different position by moving the entire second robot, but it may also have a range of movement, which is, however, preferably smaller than the range of movement of the robot arm.

Moreover, each second robot comprises a second coupling portion which is adapted to be selectively and releasably coupled with the first coupling portion of the first robot in a predetermined positional relationship, i.e., the first and second coupling portions are self-centering during coupling thereof.

Each second robot also comprises a second control means which is adapted to control the respective second robot. In particular the second control means is preferably adapted control the drive portion or both the drive portion and the tool portion of the respective second robot, wherein for each second robot, the second control means of which is adapted to control both the drive portion and the tool portion, the second control means is adapted to control the tool portion to carry out the specific operation at the selected location. An example of a second robot in which the tool portion is not controlled by the second control means is a second robot having a tool portion with a purely passive transport tool, such as a transport container into which a tool or material for use by a technician may be placed to be transported to the technician. The second control means may again comprise one or more control units, which may take the form, e.g., of one or more processing units, each comprising one or more processors. Such processing units may further include memory storing control instructions to be executed by one or more of the processors or may be adapted to receive such control instructions from an external entity via a wired or wireless data interface.

For each operation of the plurality of operations the plurality of second robots includes at least one second robot the tool of which is adapted to carry out the respective operation.

The first control means and the second control means of each of the second robots are adapted to control the drive portion of the respective second robots and the robot arm to selectively couple the first coupling portion and the respective second coupling portion in the predetermined positional relationship, subsequently the robot arm to move the tool portion together with the second robot held by the robot arm to a selected location at which the specific operation, for which the tool portion of the respective second robot is adapted, is to be carried out, and then the second robot to carry out the specific operation at the selected location. This is preferably done while the second robot is held by the robot arm, i.e., while the first and second coupling portions are coupled to each other in the predetermined positional relationship. However, additionally or alternatively it is also possible that the second robots or at least some of the second robots comprise a securing means which is adapted to selectively and releasable secure the respective second robot to a selected surface portion of the aircraft or spacecraft, such as an interior surface of the fuselage of the aircraft or spacecraft. In the latter embodiment, in which the securing means may comprise, e.g., a suction means, the respective second robot may be moved by the robot arm to the selected surface portion, to then be operated to secure it to the surface portion by the securing means, to subsequently be released from the robot arm by decoupling the first and second coupling portions, and to finally be operated to carry out the specific operation independent of and separate from the first robot, which, in the meantime, may cooperate with one or more of the other second robots in the manner described above. After carrying out the specific operation the second robot may again be coupled to the robot arm by coupling again the first and second coupling portions, the securing means may then be released, and subsequently the second robot may be moved by the robot arm to the ground or to another selected surface portion where the specific operation is to be carried out.

Thus, the first robot and the respective second robot advantageously cooperate synergistically to carry out the specific operation, in that the advantages of the first robot, such as high precision, large forces and large range of movement, are combined with the advantages of the second robots, such as being specifically adapted for carrying out the specific operation by being provided with a specialized tool. Overall, it is very simple and relatively inexpensive to add new second robots adapted for a specific operation to the system.

Further, it is advantageously possible and preferred to construct the second robots as relatively low-cost robots as compared to the first robot, which second robots nevertheless constitute dedicated system components specifically adapted for a specific operation. In particular, as long as the second robots are able to carry out their specific operation with sufficient precision while held by the robot arm or placed at a particular location by the robot arm and secured there, the second robots may have lower precision with respect to the positioning of the second robots as such than the precision achievable by the robot arm. In other words, the tool of a second robot can be positioned more precisely if the second robot is held and moved by the robot arm than by moving the second robot itself using its movement means, drive portion and first control means. The performance of the second robots may be limited by, e.g., a low resolution of sensors, such as position sensors for which inexpensive ultrasonic sensors may be used having, e.g., $\pm 0.5$ to $\pm 5$ cm resolution, $\pm 0.7$ to $\pm 3$ cm resolution, $\pm 0.8$ to $\pm 2$ cm resolution and for example $\pm 1$ cm resolution, or a small size, such as, e.g., as height of only about 0.5 m. In fact, it is even possible to choose such an inexpensive and simple construction for the second robots that they are not usable by themselves for carrying out the specific operations. In a preferred embodiment the size of the second robots is such that they are able to move through a square-shaped opening having a size of 0.5 m×0.5 m.

By contrast, the first robot can be an expensive and relatively inflexible high-performance robot, such as an automotive robot, in order to compensate for the performance deficiencies of the second robots, while nevertheless maintaining the overall costs of the robot system low. For example, the first robot may have a high precision of, e.g., $\pm 0.02$ to $\pm 0.1$ mm positioning repeatability, more preferably $\pm 0.03$ to $\pm 0.07$ mm positioning repeatability, even more preferably $\pm 0.04$ to $\pm 0.06$ mm positioning repeatability and for example $\pm 0.05$ mm positioning repeatability, a large range of movement and/or a large load carrying capability. In a preferred embodiment, the maximum radius of the range of movement of the robot arm is from 1 to 2 m, preferably 2 m. Further, the use of a large dimension first robot inside a limited working environment is made feasible, because the first robot does not have to move as such, so that the operating range can be limited to the range of movement of the robot arm, which in turn may be limited to a safe range by means of, e.g., a light barrier arrangement, thereby limiting the dangers posed to technicians. By contrast, the second robots can be chosen to be relatively small and low power, so that they likewise do not pose dangers to technicians even though they move through the working environment.

Consequently, the combination of the first and second robots allows flexibly carrying out multiple specific operations with high precision and a high range of movement with a minimum number of expensive and dangerous high performance robots, thereby allowing the technicians to concentrate only on tasks that require high skills. Due to the assignment of specific operations to dedicated second robots, the operation of the robot system is very efficient, although the robot system is lean and simple. It is also advantageously inexpensive to replace a second robot in case of malfunction or to instruct another second robot or a technician to take over, at least temporarily, for the second robot having the malfunction. Thus, the system is efficiently able to collaborate with and assist human technicians in such a manner that the overall work is distributed in a lean manner by assigning dedicated tasks to the "sub-system" (including the human technicians) or type of "sub-system" that is able to carry out the assigned task in the best and most efficient manner with the lowest opportunity costs. In other words, an overall system may include three types of "sub-systems", namely (1) multiple low-cost second robots, (2) a minimum number of high-performance first robots, and (3) highly skilled technicians, which are assigned different tasks to achieve a high degree of efficiency. In this regard, it is possible to provide for an overall control system or unit, which is adapted and operable to maintain a status of tasks to be carried out and to assign the tasks to the second robots—or first and second robots—and preferably also to technicians.

Moreover, due to the second robots advantageously being of small size and small weight, a technician is able to manually lift a second robot. This is advantageous, because in case a second robot held by the robot arm should not be able to carry out with sufficient precision or at all the specific operation, for which the tool portion of the second robot is adapted, at the selected location, because, e.g., synchronization or communication problems between the first robot and the second robot, an error in the coupling between the first robot and the second robot resulting in a relative misalignment or a complex access situation at the selected location, a technician holding the second robot may very well be able to carry out the or complete the operation. This also applies in cases, in which the specific operation includes multiple sub-tasks and the second robot is only able to complete some of the sub-tasks while being held by the robot arm. A technician holding the second robot may then be able to complete the missing sub-tasks. Thus, it is advantageously possible to temporarily or permanently substitute flexibly a system component by another system component or by a technician to achieve high efficiency.

Also, the robot system of the present invention is advantageously applicable to space applications, because it avoids the very high costs associated with transporting different types of specialized heavy robots into an orbit in space and rendering the use of conventional robot systems impractical for space applications. In this regard, some space structures, such as space stations, already have an integrated robotic arm which may be utilized as the robot arm of the first robot. On-demand delivery of small specialized second robot allows to drastically reduce total costs and total labor effort.

Furthermore, the system may comprise one or more portable stop elements, which may be placed by a technician in the movement path of a second robot approaching the first robot for coupling and for carrying out a specific operation at a selected location. Each of the second robots is then preferably adapted to detect such a stop element when it is within a defined range from the stop element. For example, the stop element may transmit a defined wireless signal, which is detectable by a corresponding sensor or receiver provided on each second robot, or the stop elements may simply be predetermined objects, such as plate-shaped objects, which are detectable by a distance sensor provided on the second robots. In the latter case, the second control means is adapted to stop movement of the second robot upon detecting the predetermined object and preferably upon detecting the predetermined object within a defined maximum distance. Thus, the stop elements may be predetermined objects as described in detail below for stopping the movement of the second robot at a defined position relative to the robot arm for the purposes of coupling. In this manner, a technician is able to manually override the programmed or instructed operation of the second robot for carrying out the respective specific operation at the respective selected location. This further adds to the advantages provided by the robot system with respect to safety when being operated in a working environment in which technicians are working simultaneously alongside the robot system.

In a preferred embodiment, the first control means is further adapted to control the first coupling portion. Alternatively or additionally the second control means of the second robots are further adapted to control the respective second coupling portion. However, it is preferable if the first and second coupling means are as passive as possible in that they preferably can be coupled by simply moving the first and second coupling means with respect to each other into a particular engagement position. In this case, it may or may not be provided that the first and/or second control means is operable to selectively operate a locking means on the first and/or second coupling portion in order to releasably lock the first and second coupling portions in the predetermined positional relationship.

In a preferred embodiment, the robot system further comprises a master control unit operable to communicate with the first control means and/or the second control means via a wired or wireless communication connection and to provide control commands or programming instructions to the first control means and the second control means, respectively. Such a master control unit is preferably located separate and remote from the first and second robots and may, by means of transmission of the control commands and programming instructions, control the overall operation of the robot system in a centralized manner.

In a preferred embodiment, the first and second control means are configured such that upon coupling the first coupling portion with the second coupling portion of one of the second robots the first control means is interfaced with the respective second control means to establish a communication connection, e.g., by data interfaces as mentioned above, and the second control means provides control commands or programming instructions for the control of the movement of the robot arm and stored in the second control means to the first control means via the communication connection. In particular, the transmission of control commands or programming instructions may be effected automatically after establishing the communication connection. This embodiment, which may be combined with the preceding embodiment having a central control unit, but it is preferred if no such central control unit is present. Then, the second robots effect decentral control of the robot system in that each second robot flexibly adapts the control of the first robot and the robot arm to its requirements during the period of time of cooperation with the first robot. This also has the advantage that when adding new second robots adapted to carry out a new specific operation it is not necessary to modify the first robot or a central control unit.

In a preferred embodiment, the drive portion, the second coupling portion and the tool portion of each of the second robots are modular units which are selectively and independently replaceable. This not only enables a cost reduction of the second robots due to being able to use a common base construction, but also allows for flexibly adapting the second robots to new or changed specific operations or to upgrade the second robots in a very simple manner.

In a preferred embodiment, which may preferably combined with the preceding embodiment including modular units, each second robot further comprises three levels arranged one on top of the other with the drive portion, the second coupling portion and the tool portion being located on a respective different one of the levels. Preferably, the drive portion is located at the lowest of the three levels, the second coupling portion is located at the middle level of the three levels and the tool portion is located at the uppermost level of the three levels. In this embodiment, which provides for a particularly simple construction and facilitates modularity, upgradability and modifiability, each of the three levels is defined by a base plate on which the drive portion, the second coupling portion and the tool portion, respectively, is mounted.

In a preferred embodiment, the tool portion of at least some of the second robots is a 3D printer, an analysis, measurement or observation tool, a transport tool, an inspection or repair tool, a heating device, a painting or coating device, or a screwing or other fastening tool. A transport tool may include, e.g., a gripping means and/or a container. Independent of the exact nature of the tool portions of the different second robots, it is generally preferred if the plurality of second robots includes at least one second robot of a first category adapted to carry out a specific operation involving a modification of the aircraft or spacecraft, at least one second robot of a second category adapted to carry out a specific operation involving observing, measuring or analyzing the result of the specific operation carried out by a second robot of the first category, and preferably also at least one second robot of a third category adapted to carry out a specific operation involving transporting a specific type of tool for use by a technician to rework or correct the result of the specific operation carried out by a second robot of the first category and observed, measured or analyzed by a second robot of the second category. In particular the tool portions and tools of the second robots of the three categories are adapted for carrying out the respective specific operation. For example, the tool portions of the second robots of the first category may be a 3D printer, a heating device, a painting or coating device, a repair tool, or a screwing or other fastening tool, the tool portions of the second robots of the second category may be an analysis, measurement or observation tool, and the tool portions of the second robots of the third category may be a transport tool. The results of the observation, measurement or analysis carried out by a second robot of the second category may be displayed or indicated by the respective second robot of the second category, so that a technician may request a second robot of the third category to retrieve and bring the appropriate reworking or correction tool. As an alternative, the results of the observation, measurement or analysis carried out by a second robot of the second category may be communicated to a remote control unit, e.g., wirelessly or by the second robot of the second category moving to and physically interfacing with the remote control unit, which remote control unit is adapted to analyze the results and to determine automatically the necessity of reworking or correction and the appropriate tool to be used and instruct a second robot of the third category to retrieve and bring the appropriate reworking or correction tool to a technician. Of course, it is also possible that the results are merely communicated in this manner to a remote display unit and displayed or indicated there for analysis by a human operator, who may then decide on possible steps to be taken. In case of a remote control unit or remote display unit the results of the observations, measurements or analyses carried out by the second robots of the second category may preferably be stored in a data base for documentation and later evaluation.

In general, the first and second coupling portions may include various means to effect the coupling, e.g., mechanical, pneumatic and/or electrical means. In case of pneumatic or electric means it is preferably to provide for safety against power failures, in that the coupling is maintained upon loss of pneumatic or electric power.

However, in a preferred embodiment the first coupling portion comprises an elongate straight coupling element, which may be, e.g., a straight bar and may have, e.g., a rectangular cross-section. The coupling element has a first longitudinal axis and extends from the robot arm such that the coupling element is selectively movable by the robot arm in a first direction, which may be a horizontal direction, along the first longitudinal axis and at least into a second direction which is perpendicular to the first longitudinal axis and is the upward vertical direction when the first longitudinal axis is oriented horizontally.

The coupling element comprises a first abutment surface extending along the first longitudinal axis. It may be, e.g., an upper straight longitudinal edge of the coupling element, for example in case the coupling element has a rectangular cross-section. The coupling element further comprises at least one second abutment surface facing away from the robot arm, preferably along the first longitudinal axis, and two spaced third abutment surfaces facing in the second direction—i.e., upwardly when the second direction is the vertical direction—and being located on opposite sides of the coupling element with respect to the first longitudinal axis.

The first coupling portion also comprises a first locking means.

The second coupling portion comprises two spaced first boundary surfaces which, as will be explained below, serve as guide surfaces for the coupling element. The first boundary surfaces, which may be portions of a generally U-shaped surface, are facing and opposing each other in a first plane, which is oriented horizontally when the respective second robot is supported by the movement means on a horizontal ground surface. They define between them a first insertion space, which is dimensioned such that the coupling element is at least partially insertible into the first insertion space through an opening between two ends of the first boundary surfaces by moving the coupling element in the first plane along the longitudinal axis of the coupling element. The first insertion space comprises a first section extending from the opening and a second section separated from the opening by the first section. The first section tapers from the opening towards the second section, i.e., it is defined by and between portions of the first boundary surfaces oriented at an angle with respect to each other.

The second coupling portion also comprises two, preferably planar, second boundary surfaces, which likewise serve as guide surfaces for the coupling element and which are arranged at an angle with respect to each other, e.g., in a V-shaped configuration. The second boundary surfaces are facing at least the second section of the first insertion space such that they define upwardly of the first insertion space a tapering second insertion space, into which the coupling element is at least partially insertible by moving the coupling element, after it has been inserted at least partially into the second section of the first insertion space, in the second direction perpendicular to the first plane. More specifically, the second insertion space tapers upwardly towards an elongate straight transition region between the two second abutment surfaces. It has a second longitudinal axis and a fourth abutment surface extending along the second longitudinal axis and facing the first insertion space in a direction perpendicular to the first plane. The fourth abutment surface, which may, e.g., be the apex of the V in case of a V-shaped arrangement of the second boundary surfaces, is configured to be contacted by the first abutment surface along the entire length thereof, when the first and second longitudinal axes are parallel to each other and the coupling element is in an topmost position—or position most distant from the first insertion space along the second direction—within the second insertion space, and to then support the coupling element against movement in the second direction and in a direction perpendicular to the first and second directions.

Moreover, the second coupling portion comprises at least one fifth abutment surface arranged and configured to be contacted by the at least one second abutment surface to limit movement of the coupling element along the second longitudinal axis in a direction away from the robot arm. Also, it comprises two spaced sixth abutment surfaces arranged and configured to be contacted by the two third abutment surfaces when the first abutment surface contacts the fourth abutment surface to then prevent rotational movement of the second coupling portion about the second longitudinal axis.

Furthermore, the second coupling portion comprises a second locking means which is adapted to be selectively engageable with the first locking means when the first abutment surface contacts the fourth abutment surface, the at least one second abutment surface contacts the at least one fifth abutment surface and the two third abutment surfaces contact the two sixth abutment surfaces, wherein when the first and second locking means are engaged movement of the coupling element along the second longitudinal axis in a direction towards the robot arm is prevented. This position then corresponds to the predetermined positional relationship. The abutment of the third and sixth abutment surfaces prevents relative rotation between the first and second coupling portions about the first longitudinal axis. The abutment of the first to sixth abutment surfaces constitutes a three-point bearing or support.

Due to this construction of the first and second coupling portion the first coupling portion and the second coupling portion are movable into and engageable in the predetermined positional relationship in a particularly simple manner without or with a minimum of electrical or pneumatic means being necessary. It is merely necessary to move the robot arm, while the movement means allows for the rotational movement of the respective second robot. More specifically, after roughly positioning one of the second robots in front of the first robot such that the robot arm may be used to introduce the coupling element into the tapering first section of the first insertion portion, the coupling element is moved in the first direction parallel to the first plane towards the opening of the first section of the first insertion space, until it directly enters the second section of the first insertion space or until it contacts at least one of the first boundary surfaces and is then guided by them into the second section while the second robot carries out rotational movement. In other words, the first boundary surfaces provide a guiding function to guide the coupling element into the second section of the first insertion space and to thereby better align the first longitudinal axis with the second longitudinal axis, i.e., the rotational orientation of the second robot with respect to the first longitudinal axis of the coupling element. This is a first self-centering step, which allows for starting from an only very rough relative orientation of the first and second robots with respect to each other for coupling.

Subsequently the coupling element is moved, prior to or after the at least one second abutment surface has been brought into contact with the at least one fifth abutment surface, upwardly in the second direction until the first abutment surface is directly moved into contact with the fourth abutment surface or until the coupling element contacts at least one of the second boundary surfaces and is then guided by them, while the second robot may carry out further rotational movement, until the first longitudinal axis is parallel to the second longitudinal axis and the first abutment surface contacts the fourth abutment surface. In other words, the second boundary surfaces provide a further guiding function to guide the coupling element both in a direction parallel to the first plane and to further improve the alignment of the first longitudinal axis with the second longitudinal axis, i.e., the rotational orientation of the second robot with respect to the first longitudinal axis of the coupling element. This is a second self-centering step.

In this sequence of steps it is possible, for example, to move the coupling element, after having been inserted at least partially into the first insertion space, at first upwardly in the second direction by a predefined distance to align the at least one second abutment surface with the at least one fifth abutment surface, such that upon further movement of the coupling element in the first direction the at least one second abutment surface contacts the at least one fifth abutment surface. In that case, the further upward movement is carried out only then.

In this embodiment the coupling element may preferably comprise two projections extending from opposite sides of the coupling element with respect to the first longitudinal axis. Each such projection has a first straight edge defining one of the second abutment surfaces, wherein the two first straight edges may preferably extend horizontally and more preferably in a common horizontal plane, and/or a second straight edge defining one of the third abutment surfaces, wherein the two second straight edges may preferably extend vertically and more preferably in a common vertical plane.

Alternatively or additionally, the second section of the first insertion space is an elongate channel portion of constant width between parallel portions of the first boundary surfaces.

Further alternatively or additionally, the second boundary surfaces are surface portions of at least one boundary element defining the at least fifth abutment surface. For example, in the case the boundary element is plate shaped the at least one fifth abutment surface may be provided by terminal or lateral edges of the boundary element.

Further alternatively or additionally, the two sixth abutment surfaces are portions of a surface of a plate element, e.g., a base plate on which the tool portion is mounted, as in the embodiment with multiple levels described above.

In each of the above embodiments having third abutment surfaces, the angular orientation of the third abutment surfaces, such as, e.g., of the second straight edges, may be adjustable, thereby preferably allowing for tolerance compensation.

In a preferred embodiment, the second control means is adapted to receive a control command, which is addressed to a particular one of the second robots, instructing the respective second robot to move to a location within the range of movement of the robot arm. For this purpose, the second control means controls the drive portion to operate in accordance with the control command. Once the location within the range of movement of the robot arm is reached the robot arm may be controlled by the first control means to move for the purpose of coupling the first and second coupling portions in the manner described above.

The control command instructing the respective second robot to move to a location within the range of movement of the robot arm may be, e.g., a control command issued by the above-described central control unit, by a remote control unit carried by a technician, or by a voice command received from a technician. In the latter case, the second control means of the second robot may be provided with at least limited speech recognition capability. Voice commands may be particularly advantageous, because a technician needing to carry out one of the specific operations merely needs to call out for a corresponding second robot, which may be positioned in a remote waiting position, without requiring additional equipment. Generally, the control command may include location information indicating a particular location within the range of movement of the robot arm, which is then used during the control in order to move the second robot to the respective location. For example, the control command may be an IMES (indoor messaging system) command.

The first robot may be configured to detect when a second robot has reached some location or a specific location within the range of movement of the robot arm, and to control the robot arm for the purpose of coupling the first and second coupling portions may be based on such detection. For example, the first robot may be equipped with a camera, a laser measuring system, an infrared measurement system, a distance measurement system or some other type of sensor arrangement adapted to recognize the presence of a second robot. When using a camera, the detection may be based on pattern recognition implemented in the first control means, wherein the second robots may be provided with markers which create a pattern easily recognizable by the pattern recognition algorithm. It is also possible for the first robot to include receivers adapted to detect laser beams of different wavelengths emitted by lasers provided on the second robots. All of the above measurement systems and sensors may alternatively or preferably additionally be used to continuously or intermittently detect the position—and preferably also the orientation—of the second robot relative to the robot arm during the coupling procedure, and the corresponding control of the robot arm by the first control means is preferably based on the detected position. This is advantageous, because the second robots can be constructed in an inexpensive manner without navigation capabilities allowing them to precisely reach an absolute position. In general, it is preferred in all embodiments of the invention that the second robots are not provided with such precise navigation capabilities, but that they are only provided with capabilities enabling them to roughly reach a specified absolute position or, preferably, a specified relative position with respect to particular features of the working environment, such as walls of a fuselage of an aircraft or spacecraft or other walls present in the working environment such as, e.g., walls of a room in which such a fuselage is located or moveable walls, which are adapted to be suitably positioned by the technicians in order to guide the second robots along a desired path. For example, each of the second robots may comprise a distance sensor arrangement, including for example one or more ultrasonic sensors, allowing them to move along an at least roughly defined path and in an at least roughly defined orientation in a specified distance from a wall of the working environment.

Alternatively or additionally, both the first and second control means may be adapted to receive a control command instructing the robot arm and the respective second robot to move to a location indicated by the control command. Once the positions are reached the robot arm may carry out a pre-programmed sequence of coupling movements and/or may be controlled as described above on the basis of a detected position of the second robot. In one particular example, in which the control command may be, e.g., an IMES command, after having received the control command both the robot arm and the addressed second robot move to the location indicated by the control command. Further, the robot system comprises a portable control base, which can be flexibly and selectively placed at different locations by a technician. The control base is provided with position detection means, such as ultrasonic sensors, IR measurement means, laser measurement means, optical measurement means and/or magnetic sensors, allowing the control base to precisely determine the position of a second robot and preferably also of the robot arm when they are within a certain range from the control base. Further, the control base is adapted to wirelessly transmit control commands to such second robot and, if applicable, to the robot arm, which control commands include navigation instructions for navigating from the determined position to a precise location relative to the control base. The second control means and, if applicable, the first control means are adapted to control the movement of the second robot and the robot arm, respectively, in accordance with the control commands to reach the precise location relative to the control base. In this manner, a technician is able to flexibly decide on a location for coupling between the robot arm and a second robot simply by appropriately placing the control base and without the second robots requiring precise absolute navigation capabilities. In this example, the first and second control means may also be adapted to detect a predefined proximity of the control base, and to switch over control upon detecting such proximity.

In a preferred version of the above-described embodiment, in which the second control means is adapted to receive a control command instructing the respective second robot to move to a location within the range of movement of the robot arm, each of the second robots comprises a sensor arrangement coupled to the respective second control means and operable to sense a predetermined object, wherein the second control means is adapted to stop movement of the second robot to the location within the range of movement of the robot arm upon detecting the predetermined object and preferably upon detecting the predetermined object within a defined maximum distance. The predetermined object, which may be, e.g., a plate-shaped object easily detectable by an ultrasonic or other distance sensor, may be mounted to the robot arm and in particular to the first coupling portion—such as, e.g., the coupling element mentioned above—, so that the position of the robot arm determines the stop position of the second robot to thereby achieve a defined relative positioning between the robot arm and the first coupling portion and the second robot for the purpose of coupling. Alternatively, the predetermined object may be portable and separate from the robot arm, and the robot arm may likewise comprise a sensor arrangement operable to sense the predetermined object, preferably within a defined maximum distance, such that the robot arm may reach a predefined stop position relative to the predetermined object, from which a pre-programmed sequence of coupling movements of the robot arm may be carried out once the second robot has reached its own stop position relative to the predetermined object. In the latter case, a technician may flexibly select to exact coupling location by appropriately placing the predetermined object.

In this embodiment, the sensor arrangement may be a distance sensor arrangement adapted to sense a distance between the distance sensor arrangement and the predetermined object, wherein the second control means is adapted to stop movement of the second robot to the location within the range of movement of the robot arm upon detecting the predetermined object at a predetermined distance. For example, the distance sensor arrangement may comprise one or more ultrasonic sensors.

The above-described robot system may be operated in the various manners stated in detailed above. Consequently, the present invention also provides corresponding methods for operating the robot system. In one embodiment, a method of operating a robot system concerns an embodiment of the robot system, in which the first robot is positioned in proximity of a fuselage of an aircraft or spacecraft in a working environment, such that the tool of each second robot is able to reach a portion of the fuselage when held by the robot arm, the robot system further comprises at least one third robot, which is of identical construction as the first robot and is located in a remote storage region, in which a plurality items 12 are stored in compartments of a storage rack, and the plurality of second robots comprises at least one second robot of a first category adapted to carry out a specific operation involving a modification of the aircraft or spacecraft, at least one second robot of a second category adapted to carry out a specific operation involving observing, measuring or analyzing the result of the specific operation carried out by one of the second robots of the first category, and at least one second robot of a third category adapted to carry out a specific operation involving transporting a specific type of item for use by a technician to rework or correct the result of the specific operation carried out by one of the second robot of the first category and observed, measured or analyzed by one of the second robots of the second category. The method then preferably comprises operating the first robot and one of the second robots of the first category to couple the second robot to the robot arm, to carry out the respective specific operation involving a modification of the aircraft or spacecraft, and to subsequently decouple the second robot from the robot arm. Subsequently, the method comprises operating the first robot and one of the second robots of the second category to couple the second robot to the robot arm, to carry out the respective specific operation involving observing, measuring or analyzing the result of the specific operation carried out by the second robot of the first category in the preceding step. Then, the method comprises analyzing the result of the observation, measurement or analysis carried out by the second robot of the second category in the preceding step in order to determine whether one of the items is needed by a technician to rework or correct the result of the specific operation carried out by the second robot of the first category in the first step, and, if one of the items is needed, operating, on the basis of the analysis of the result, the third robot and one of the second robots of the third category to couple the second robot to the robot arm of the third robot, lift the second robot with the robot arm to the determined item, operate the second robot to move the item onto the tool of the second robot, and decouple the first and second robots, or move the determined item with the robot arm onto the tool of the second robot, and transport the determined item by the second robot to a technician in the working environment. Further modifications to this method have been described in detail above in connection with a robot system comprising second robots of the first, second and third categories.

BRIEF DESCRIPTION OF THE DRAWINGS

In the following, advantageous embodiments will be explained in more detail with reference to the drawings.

FIG. 5 shows a detailed front view of a second robot, which is adapted to carry out a transport operation, and FIG. 6 shows a detailed front view of a second robot, which is adapted to carry out a 3D printing operation, and FIGS. 7a to 7c show a schematic representation of a possible coupling mechanism for coupling the first and second robots, and FIG. 8 shows a schematic representation of the movement of a second robot with respect to a first robot.

DETAILED DESCRIPTION

Figure 1:
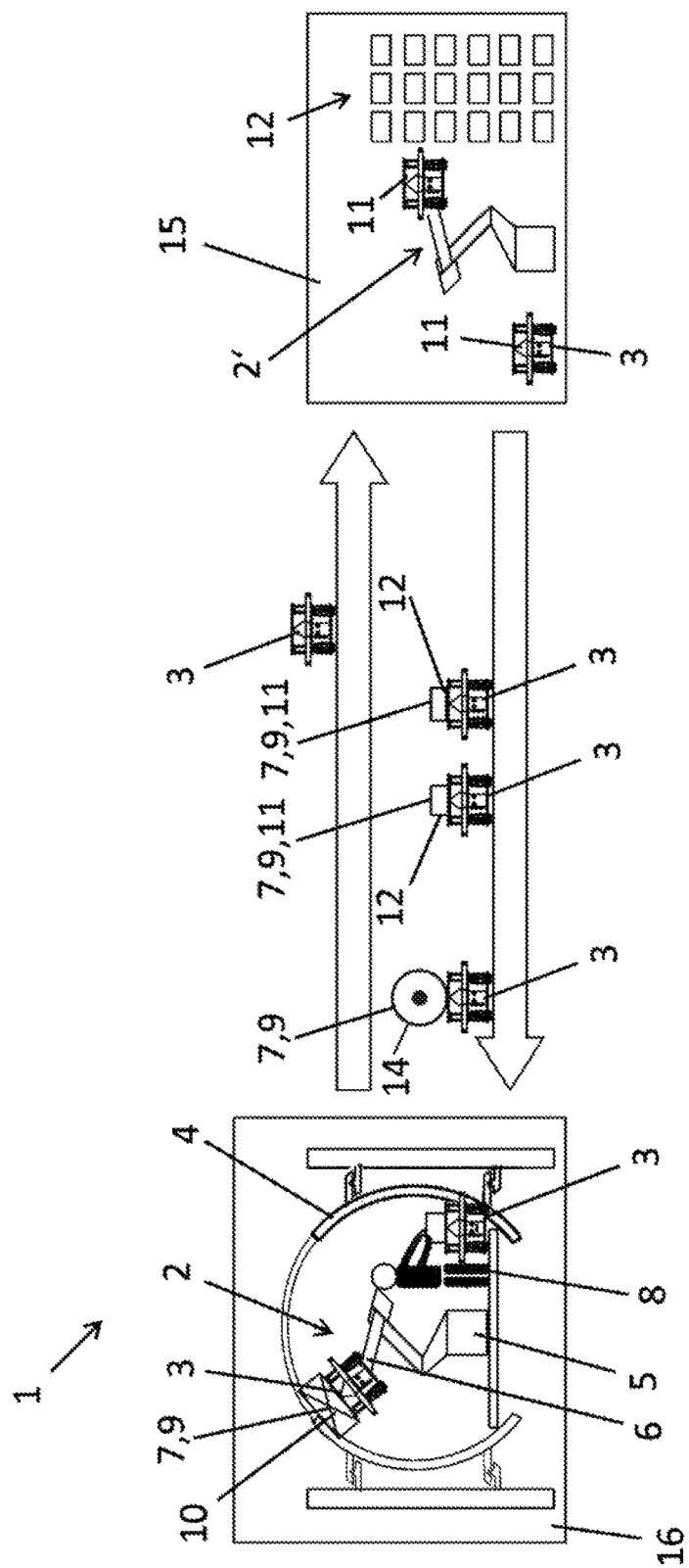
FIG. 1 shows a schematic overview of a robot system according to an embodiment of the present invention.

The robot system 1 shown in FIG. 1 comprises at least one stationary first robot 2, which may be a conventional industrial robot, and a plurality of smaller and movable second robots 3. The first robot 2 is positioned inside the fuselage 4 of an aircraft or spacecraft during assembly of the aircraft or spacecraft. It comprises a base 5 and a robot arm 6 extending from and movable with respect to the base 5. One of the second robots 3 is shown coupled to the end of the robot arm 6 remote from the base 5, and the robot arm 6 is utilized to move the second robot 3 to and maintain it in a position in which the second robot 3 is able to carry out a specific operation at a specific location of an interior wall portion of the fuselage 4.

As will be explained in more detail with reference to FIGS. 3 to 5 below, each of the second robots 3 comprises a tool portion 7 adapted to carry out one of a plurality of different specific operations, so that after for carrying out a selected one of the specific operations a corresponding second robot 3 may be coupled to and held by the robot arm 6, which is then controlled to move the second robot 3 to the location at which the selected specific operation is to be carried out. In this manner, the advantages of the first robot 2, such as high load carrying capability, large range of movement of the robot arm 6 and high precision of movement and positioning, are synergistically combined with advantages of the second robots 3, such as relatively low price, low dangers posed to the technicians 8 working alongside the first and second robots 2, 3 inside the fuselage 4 and dedicated adaption to a specific operation. In other words, the first robot 2 may be a general purpose robot, which is flexibly and selectively adapted to a specific operation by coupling to a corresponding second robot 3.

The tool portion 7 of each of the second robots 3 includes a tool 9 adapted to carry out the respective specific operation. For example, the tool 9 may be a 3D printer 10 (see also FIGS. 3 and 6) adapted to directly print a three-dimensional object, such as, e.g., a bracket, to a portion of the fuselage 4 (such as described, e.g., in the document EP 2 813 432), a transport tool 11 adapted to hold and carry an item 12, such as material or a tool for use by a technician 8 (see also FIG. 5), or a measurement or observation tool 14 (see FIG. 4) adapted to perform a specific measurement or observation. As illustrated in FIG. 1, the second robots having a transport tool 11 may be utilized to obtain a desired item 12 from a remote storage region 15, where also the second robots 3 currently not in use are located, and to carry the item 12 into the fuselage 4. In this regard, such a second robot 3 may then be coupled to the robot arm 3 in order to lift the item 12 to a raised location at which it is needed by the technician 8. However, as illustrated in FIG. 1, it is also possible that the second robot 3 is used to directly carry the item 12 to a location selected by the technician 8 without being coupled to the robot arm 6. The remote storage region may be, for example, a logistics hangar, for, e.g., a plant, or logistics room, for, e.g., a space station.

As explained above, the second robots 3 including a 3D printer 10 are second robots 3, 10 of a first category adapted to carry out a specific operation involving a modification of the aircraft or spacecraft, the second robots 3, 14 including a measurement or observation tool 14 are second robots of a second category adapted for observing, measuring or analyzing the result of the specific operation carried out by a second robot of the first category, and the second robots 3, 11 including a transport tool 11 are second robots of a third category adapted to carry out a specific operation involving transporting a specific type of tool for use by a technician to rework or correct the result of the specific operation carried out by a second robot 3, 10 of the first category and observed, measured or analyzed by a second robot of the second category. For example, the results of the observation, measurement or analysis carried out by a second robot 3, 14 of the second category may be displayed or indicated by the respective second robot of the second category 3, 14, so that a technician may request a second robot 3, 11 of the third category to retrieve and bring the appropriate reworking or correction tool.

It is to be noted that at least one robot 2', which is of identical construction as the first robot 2 and could replace the first robot 2 in case of a malfunction of the first robot 2, is preferably located in the remote storage region 15, thereby creating additional redundancy. The robot 2' is adapted and operable to either retrieve items 12 from a storage rack holding multiple different items 12 and load a retrieved item 12 onto a second robot 3 having a transport tool 11, or to couple its robot arm in the manner described herein to a second robot 3 having a transport tool 11 and to lift the second robot 3 to a storage rack compartment in which the desired item 12 is stored, so that the second robot 3 may retrieve the item 12 and load it onto its transport tool 11. In the latter case, the transport tool 11 is preferably constructed such that it includes a gripping element which can be extended towards or into the storage rack compartment, grip the item 12 and retract it onto the second robot 3. The robot 2' can also be used to lift second robots 3 to other locations within the remote storage region 15, such as, e.g., the location of a charging station.

Thus, the second robots 3 move back and forth, as required, between the storage region 15 and the working environment 16, such as the interior of the fuselage 4. The operation and movement of the first robot 2 is controlled by a control unit 17 (see FIG. 3), and the operation and movement of the second robots 3 is controlled by a control unit 18 (see FIG. 4) provided in each of the second robots 3. These control units 17, 18 may receive control commands from a central control unit (not shown). However, it is preferred if the control units 18 of the second robots 3 operate independently and provide control commands or programming instructions to the control unit 17 of the first robot 2 upon coupling between the respective second robot 3 and the robot arm 6, so that the second robot 2 is adapted to the requirements of the particular second robot 3 upon coupling. This allows for a particularly high degree of flexibility and adaptability of the system 1.

Figure 2:
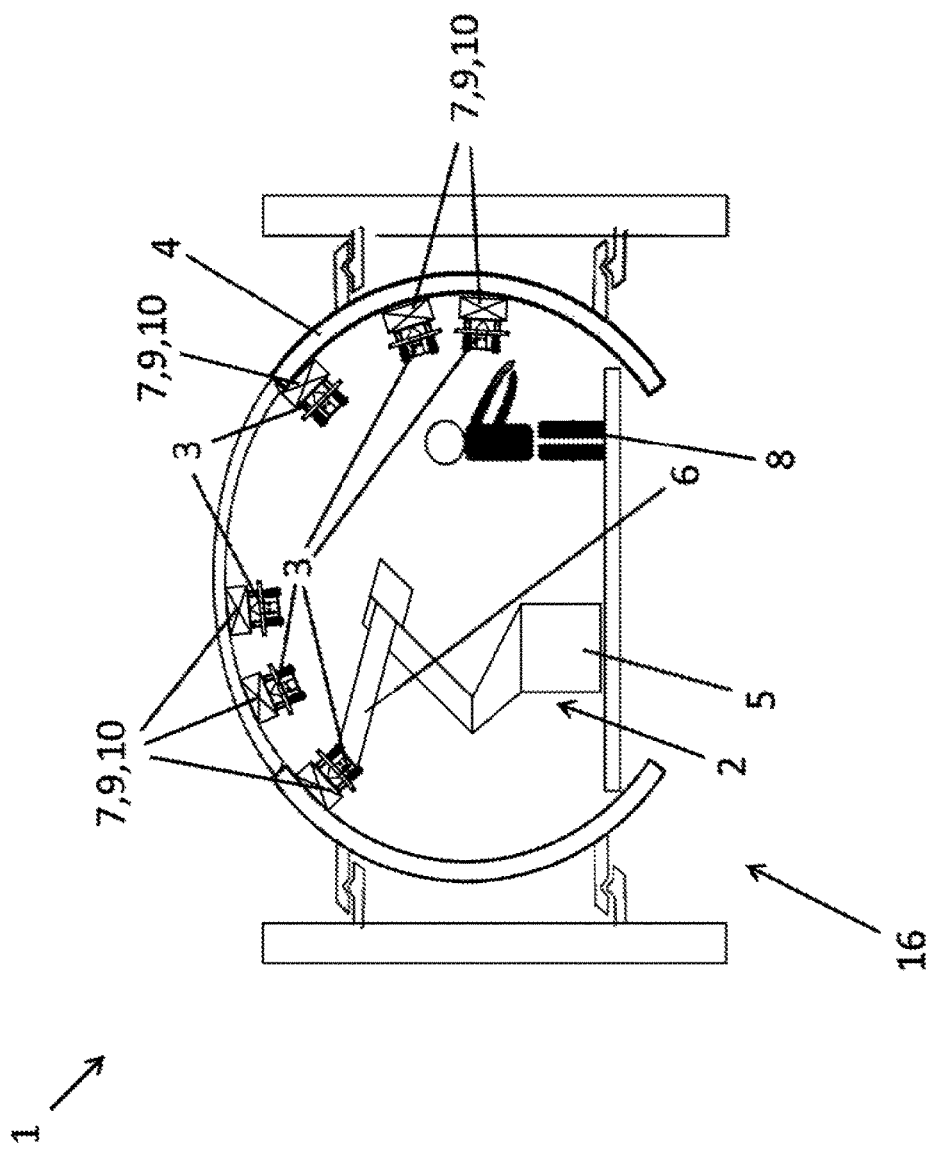
FIG. 2 shows a schematic overview of a portion of another robot system according to an embodiment of the present invention.

In FIG. 1 a second robot 3 is coupled to and held by the robot arm 6 during carrying out its specific operation. However, as illustrated in FIG. 2, it is alternatively or additionally possible that the second robots 3 are placed by the robot arm 6 at the location at which the specific operation is to be carried out, and to then secure themselves at that location, e.g., by suction means, so that the robot arm 6 may be used for other purposes while the specific operation is carried out by the second robot 3. Afterwards, the robot arm 6 is controlled to retrieve the second robots 3 and to put them on the ground, so that they may move back to the storage region 15. Multiple second robots 3 may be placed and secured at different locations by a single robot arm 6.

Figure 3:
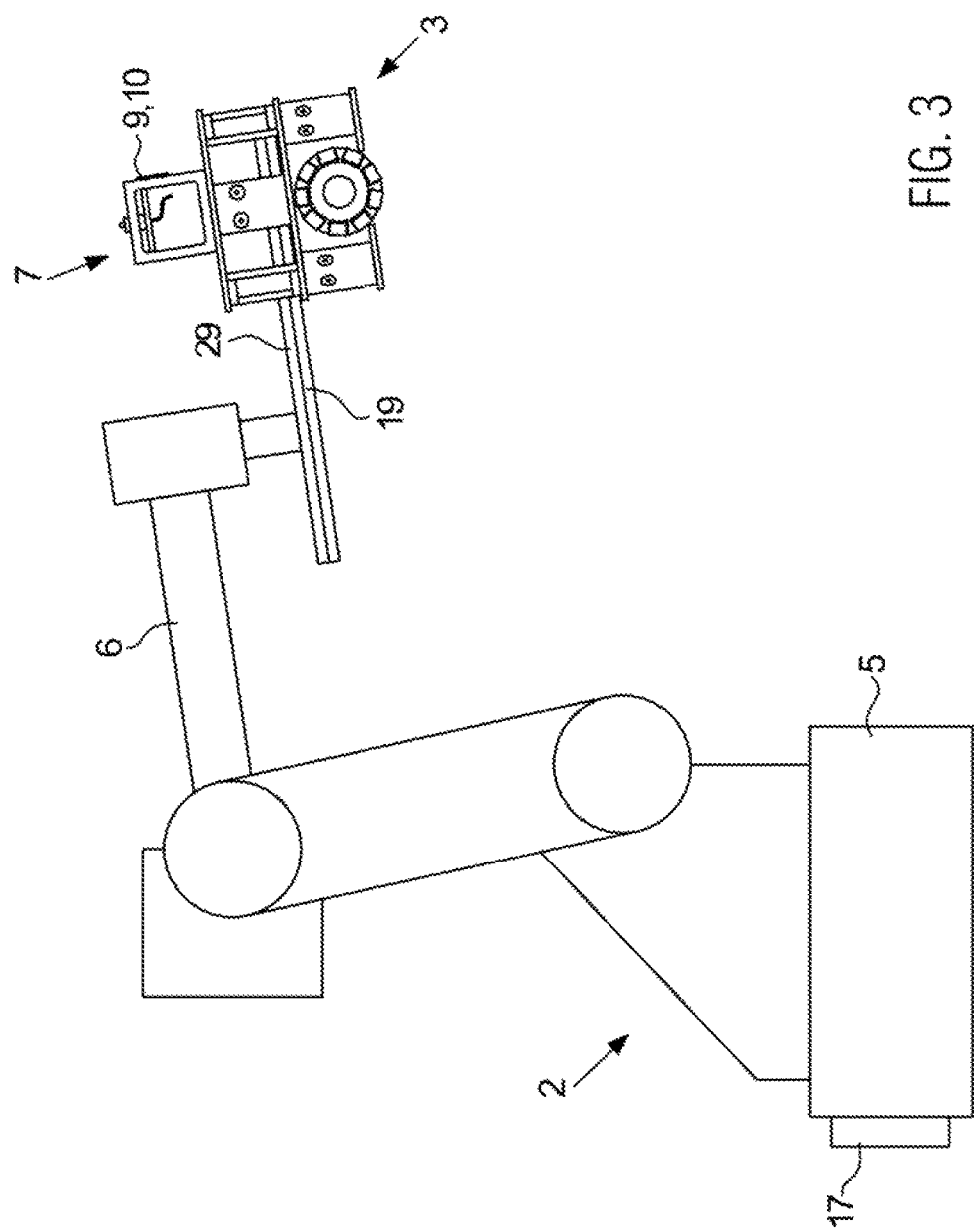
FIG. 3 shows a first robot and a second robot coupled to each other, wherein the second robot is adapted to carry out 3D printing.

FIG. 3 shows a detailed perspective view of a second robot 3 coupled to the robot arm 6. The robot arm 6 comprises a coupling element in the form of an elongate straight bar 19 having a square-shaped cross-section. The bar 19 is secured at one end region to the robot arm 6 and extends from the robot arm 6. The second robot 3 is secured to the bar 19 in a manner described in the following with reference to FIG. 4.

Figure 4:
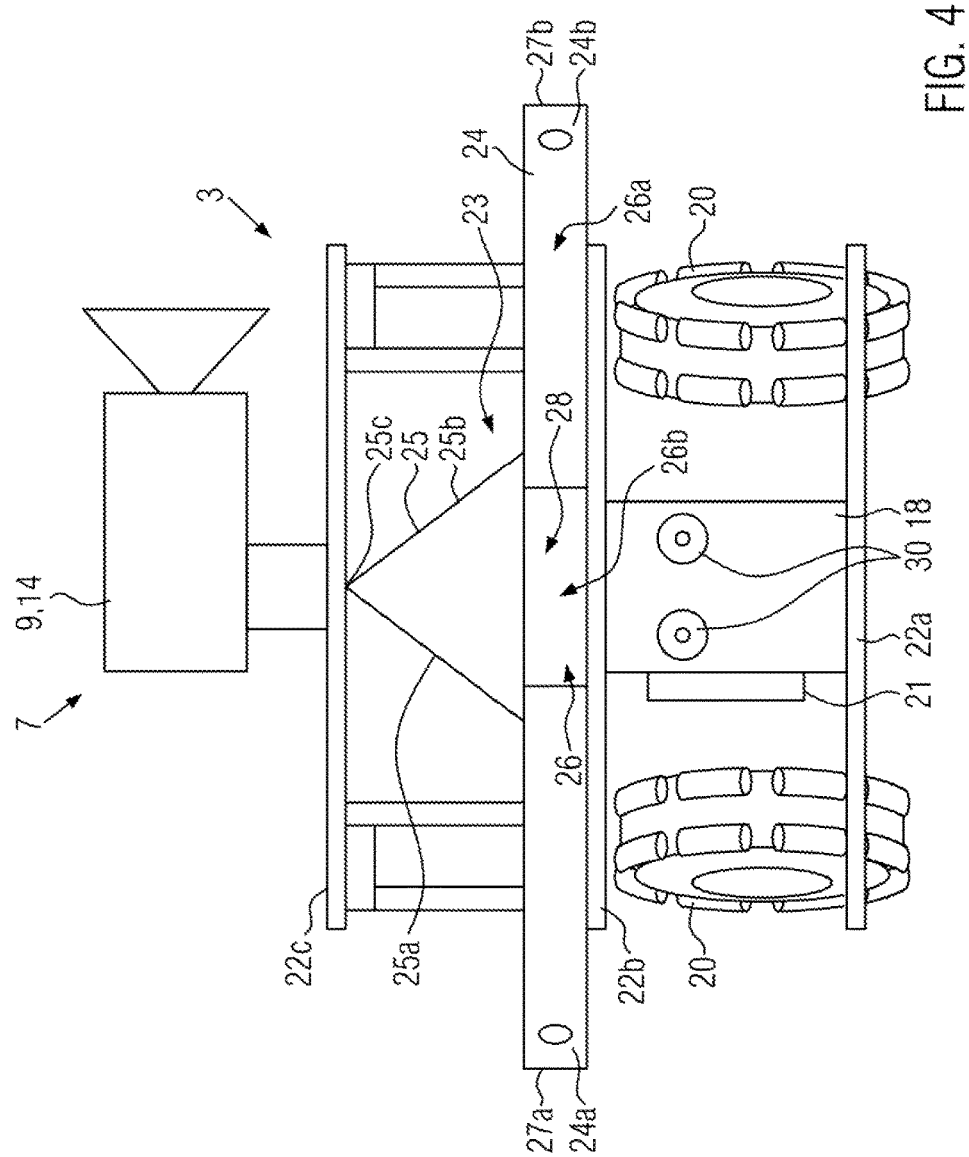
FIG. 4 shows a detailed front view of a second robot, which is adapted to carry out a measurement or observation task.

FIG. 4 shows a front view of another second robot 3. The second robot 3 comprises a plurality of wheels 20 which are configured to allow both for translational movement of the second robot 3 and for rotational movement of the second robot 3 about a vertical central axis of the second robot 3. The wheels 20 are coupled to an electric motor 21 so that they may be driven by the electric motor 21 for translational movement and preferably also rotational movement. The electric motor 21 and the wheels 20 are mounted, together with the control unit 18, on a first mounting plate 22a. The second robot 3 also comprises a second mounting plate 22b and a third mounting plate 22c, which are disposed spaced from each other and spaced from the first mounting plate 22a above and parallel to the first mounting plate 22a. To the third mounting plate 22c, which is the topmost mounting plate, the tool 9 is mounted, and to the second mounting plate 22b a coupling portion 23 is mounted. The mounting plates 22a, 22b and 22c define three different levels, each of which has a dedicated functionality, so that the second robot 3 advantageously has a modular configuration, which simplifies the construction and configuration of the second robots 3.

FIG. 5 shows a front view of a yet another second robot 3, which is identical to the second robots 3 of FIGS. 3 and 4 with the exception that the tool portion 9 includes a transport tool 11 in the form of a gripping and retaining tool. In FIG. 5 a container 13 holding an item 12 is retained by the transport tool 11.

The coupling portion 23 illustrated in FIGS. 4 and 9a to 9e is adapted for coupling to the bar 19 in a self-aligning manner. For this purpose, the coupling portion 23 comprises a generally U-shaped first guide element 24 made of metal sheet-material, and a generally V-shaped second guide element 25 likewise made of metal sheet-material. The first guide element 24 is configured such that two opposing portions 24a, 24b of an interior surface of the general U-shape constitute two first guide surfaces 24a, 24b, which are spaced from and facing each other in a plane parallel to the plane defined by the second mounting plate 22b, thereby defining a planar first insertion space 26 between them. The first insertion space 26 has an entrance opening defined between the two ends 27a, 27b of the first guide surfaces 24a, 24b. From the two ends 27a, 27b the first guide surfaces 24a, 24b at first extend at an angle with respect to each other to define a tapering section 26a of the insertion space 26, before they change into a parallel relative orientation to define a straight narrow channel section 26b.

The second guide element 25 is arranged above the channel section 26b of the first insertion space 26 in such a manner that the concave side of the V-shape is facing the channel section 26b and the straight apex line of the V-shape is extending centrally over and parallel to the longitudinal extension of the channel section 26b. Thus, the second guide element 25 is arranged to provide two planar second guide surfaces 25a, 25b, which are arranged at an angle with respect to each other and which meet at a transition region 25c at the straight apex line of the V-shape. Due to this arrangement the second guide surfaces 25a, 25b define and limit a second insertion space 28, which is tapering from the channel section 26b towards the transition region 25c.

FIGS. 9a to 9e show the bar and the coupling portion of FIGS. 3 and 4 in an isolated manner in a schematic perspective view and illustrate the steps of coupling the bar to the coupling portion. For coupling the bar 19 to the coupling portion 23, the respective second robot 3 is moved to a position within the range of movement of the robot arm 6, such that the bar 19 may be inserted into the first insertion space 26 (see FIG. 9a). Due to the tapering section 26a, the rotational orientation of the second robot 3 must not be precisely aligned with the longitudinal axis of the bar 19. Rather, when the wheels 20 allowed for rotational movement of the second robot 3 about a central vertical axis, in case the longitudinal axis of the bar 19 is not aligned with the longitudinal axis of the channel section 26b, upon movement of the bar 19 along its longitudinal axis towards the second robot 23 in the plane of the first insertion space 26 the bar 19 will eventually contact one of the first guide surfaces 24a, 24b in the region of the tapering section 26a. Upon further movement of the bar 19 the bar 19 will be guided along the first guide surfaces 24a, 24b towards and into the channel section 26b while the second robot 3 at the same time performs a corresponding rotational movement, thereby carrying out a first alignment between the longitudinal axis of the bar 19 and the longitudinal axis of the transition region 25c. The first alignment is relatively rough due to a relative large width of the channel section 26b as compared to the width of the bar 19.

Figure 9A:
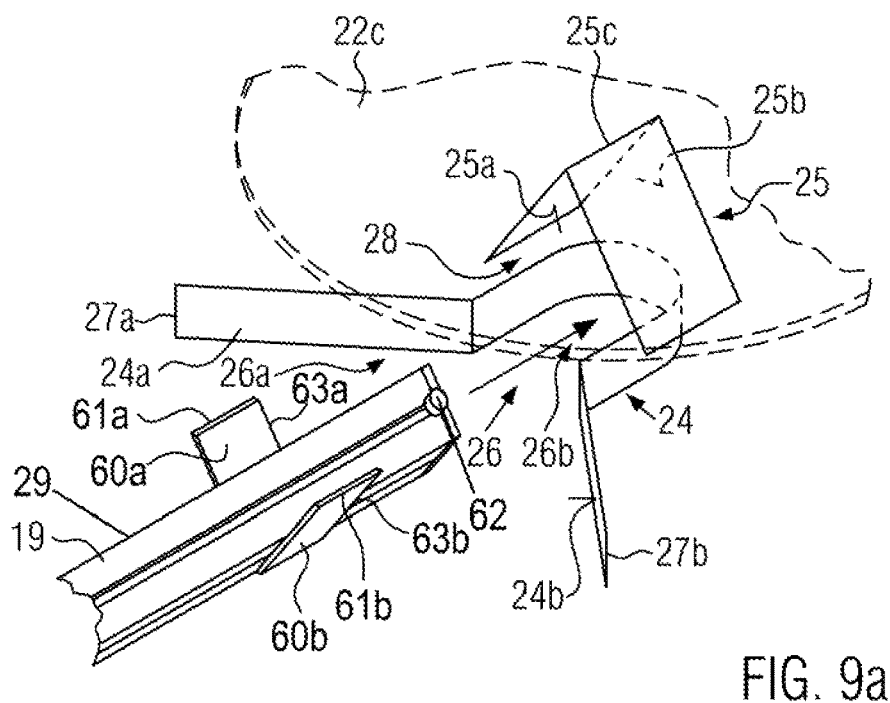
FIGS. 9a to 9e show the bar and the coupling portion of FIGS. 3 and 4 in an isolated manner in a schematic perspective view and illustrate the steps of coupling the bar to the coupling portion.
Figure 9B:
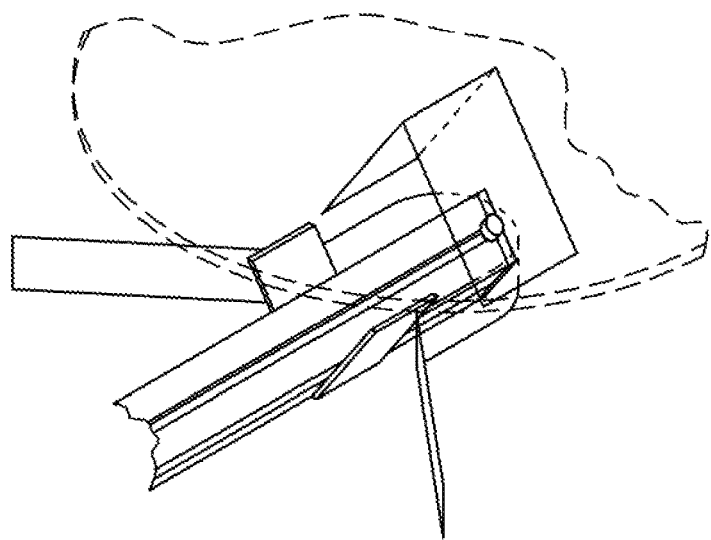
Figure 9C:
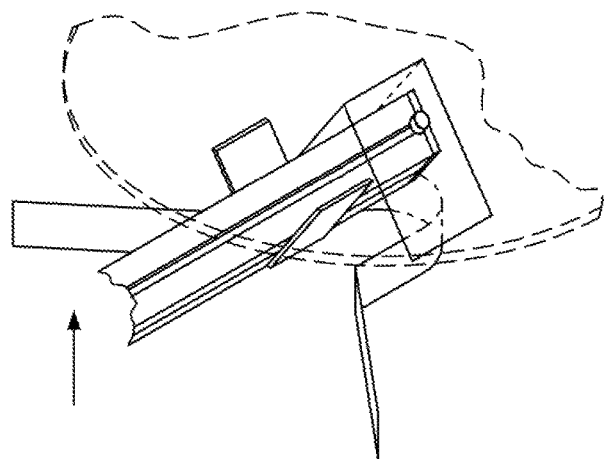
Figure 9D:
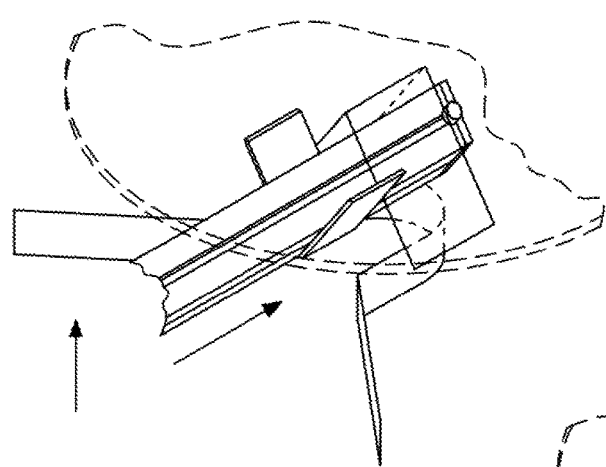

Once the bar 19 has been partially inserted into the channel section 26b (see FIG. 9b), it is moved upwardly into the second insertion space 28 about halfway between the channel section 26b and the transition region 25c (see FIG. 9c). Then the bar 19 is again moved along its longitudinal axis until the front edge 63a, 63b of at least one of two plate-shaped projections 60a, 60b extending laterally from opposite sides of the bar 19 contact one of the front edges of the second guide element 25, thereby defining a predetermined distance between the robot arm 6 and the second robot 3 (see FIG. 9d).

Subsequently, the bar 19 is again moved upwardly while the projections 60a, 60b slide with the edges 63a, 63b along the front edge of the second guide element 25. Unless the straight upper edge 29 of the bar 19 (see FIG. 3) is perfectly aligned with the transition region 25c, the bar 19 will eventually contact one of the second guide surfaces 25a, 25b and upon further upward movement will be guided into the transition region 25c until the upper edge 29 is supported against the transition region 25c in the apex of the V-shape (see FIG. 9e). At the same time, the second robot 3 will carry out a translational and rotational movement which effects a precise second alignment between the longitudinal axis of the bar 19 and the longitudinal axis of the transition region 25c and also defines a predetermined height of the second robot 23 with respect to the robot arm 6.

Figure 9E:
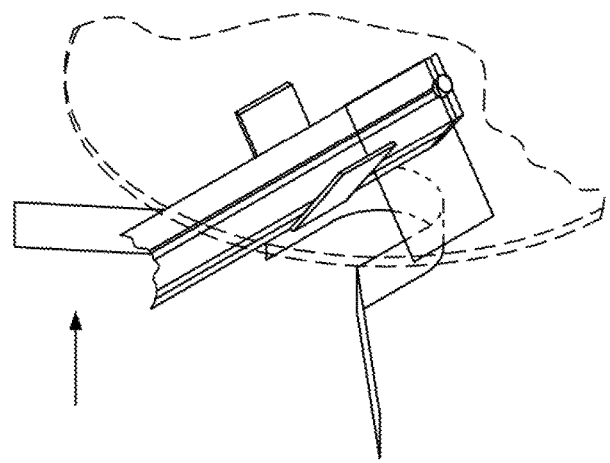

Due to the contact between the upper edge 29 of the bar 19 and the transition region 25c, the second robot 3 is supported against translational movement in the horizontal direction and against rotational movement about a vertical axis. In order to support the second robot 3 also against rotational movement about a horizontal axis the upper edges 61a, 61b of the projections 60a, 60b of the bar 19 are configured to contact the lower surface of the third mounting plate 22c at spaced locations, thereby completing a three-point support (see FIG. 9e). In this state, a locking mechanism is engaged for preventing decoupling of the second robot 3 from the bar 19. For example, the locking mechanism may comprise a locking projection 62 laterally extending from the bar 19 near the terminal end thereof and disposed such that it extends past the rearward edges of the second guide element 25. The locking projection 62 is spaced from the front edges 63a, 63b of the plate-shaped projections 60a, 60b in the axial direction of the bar 19, so that the guide element 25 is axially retained between the locking projection 62 and the front edges 63a, 63b, as illustrated in FIG. 9e.

In the above example, the coupling portion 23 constitutes a first coupling portion and the bar 19 constitutes a second coupling portion, which are adapted to be coupled to each other in a self-aligning manner. An alternative example for a coupling arrangement comprising a first coupling portion 40, which is provided on the robot arm 6 of the first robot 2, and a second coupling portion 41, which is provided on each of the second robots 3, is schematically illustrated in FIGS. 7a to 7c. The first coupling portion 40 comprises a plurality of, e.g., three, receptacles 42, which each comprise a pin receiving portion 43 and a tapering entrance portion 44 tapering towards the pin receiving portion 43. The pin receiving portion 43 is dimensioned such that an elongate pin 45 of, e.g., circular cross-section may enter and exit the pin receiving portion 43 through the entrance portion 44 by a movement perpendicular to the longitudinal axis of the pin 45 (see the double headed arrow in FIG. 7b). For each of the receptacles 42 a pin 45 is provided as part of the second coupling portion 41.

The receptacles 42 and pins 45 are arranged on a respective imaginary circle (indicated by the dashed line 46 in FIG. 7c) in such a manner that when the first and second coupling portions 40, 41 are suitably aligned with each other the pins 45 are simultaneously movable into the pin receiving portions 43 into the position shown in FIGS. 7a and 7b and out of the receptacles 42 by means of a corresponding relative rotation of the first and second coupling portions 40, 41 with respect to each other about the central axis of the circle 46 (see FIG. 7c).

The second coupling portion 41 further comprises, for each of the pins 45, an elongate and, e.g., cylindrical locking bolt 47 which is selectively movable along the direction of its longitudinal axis between the position illustrated in FIG. 7a, in which it extends into the interior of the associated receptacle 42 such that the pin 45 is prevented from leaving the pin receiving portion 42, and the position illustrated in FIG. 7b, in which the locking bolt 47 is removed from the interior of the receptacle 42 to thereby allow entry and exit of the pin 45. For example, the locking bolt 47 may be insertible through openings 48a, 48b (only indicated in FIG. 7a) provided in side walls of the pin receiving portion 43.

The above movement of the locking bolts 47 is preferably effected by a respective plurality of locking bolt movement devices 49, which, in the illustrated embodiment, are pneumatic devices comprising a cylinder 50, in which a movable piston 51 is disposed. The movable piston 51 is biased by a compression spring 52 or another biasing means into the position shown in FIG. 7a, in which the locking bolt 47 is in the locking position. In order to move the locking bolt 47 into the unlocked position of FIG. 7b, a pneumatic medium, such as pressurized air, may be introduced into the cylinder 50 through a port 53, thereby moving the piston 51 upwardly inside the cylinder 50 and, due to the coupling linkage 54 between the piston 51 and the locking bolt 47, the locking bolt 47 out of the interior of the pin receiving portion 43. Importantly, due to the pre-biasing of the locking bolt 47 into the locking position by the spring 52, the first and second coupling portions 40 and 41 remain securely coupled and locked to each other in the case of a power failure, i.e., a loss of pneumatic pressure. It is also possible that the locking bolt movement devices 49 are electrically operated, wherein the locking bolt 47 is likewise advantageously pre-biased into the locking position.

The second coupling portion 41 may be provided on the second robots 3 in any suitable location and orientation. For example, the second coupling portion 41 may be mounted with the circle 46 in a horizontal or vertical orientation on the second mounting plate 22a instead of the coupling arrangement 23, or below the first mounting plate 22a such that the plane of the circle 46 is parallel to the first mounting plate 22a. The first coupling portion 40 may be mounted directly on the robot arm 6 instead of the bar 19 or, alternatively, on the bar 19. In the latter case, the coupling arrangements of FIG. 4 and FIGS. 7a to 7c may also be combined in such a manner that the first and second coupling portions 40 and 41 are provided in addition to the bar 19 and the coupling portion 23 of FIG. 4 and constitute the locking mechanism of the bar 19 and the coupling portion 23.

It should be noted that it is also possible that the above configurations of the first and second coupling portions 40 and 41 are reversed, i.e., that the first coupling portion 40 comprises the pins 45 and locking bolt movement devices 49 and the second coupling portion 41 comprises the receptacles 42.

The second robot also comprises three ultrasonic distance sensors 30, 31 and 32, wherein the ultrasonic distance sensor 30 is disposed on the side visible in FIG. 4 and facing the robot arm during coupling, the ultrasonic distance sensor 31 is disposed on the opposite side and facing in the opposite direction (see FIG. 8), and the ultrasonic distance sensor 32 is disposed in a direction perpendicular to the directions in which the sensors 30 and 31 are facing and, more particular, in a movement direction of the second robot (see FIG. 8). It should be noted that other types of distance sensors could also be used instead of ultrasonic distance sensors. As illustrated in FIG. 8, the ultrasonic distance sensor 31 is operable to detect a distance between a second robot 3 and a wall of the fuselage 4, and the control unit 18 of the second robot 3 is operable to control the second robot 3 to move in a predefined, selectable or adjustable distance along the wall. The sensor 30 is operable to detect a distance between it and objects in front of it or to generally detect whether an object is located within a defined maximum distance in front of the sensor 30. The control unit 18 receives the sensor signal of the sensor 30 and is operable to detect, based on the sensor signal, a plate 33 mounted on the bar 19 and to control the second robot 3 to stop its movement along the wall of the fuselage 4 in front of the plate 33. In this manner the roughly defined position and orientation of the second robot 3 with respect to the bar 19 may be obtained in a simple manner without requiring the second robot 3 to have complex navigation means. The ultrasonic distance sensor 32 is likewise operable to detect a distance between it and objects in front of it or to generally detect whether an object is located within a defined maximum distance in front of the sensor 32, and the control unit 18 receives the sensor signal of the sensor 32 and is operable to control, based on the sensor signal, the second robot 3 to stop its movement upon detecting an obstacle in the movement path or to change the path of movement in order to go around the obstacle, e.g., by adjusting the distance maintained between the wall 4 and the sensor 31.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A robot system for carrying out a plurality of operations during assembly or maintenance of an aircraft or spacecraft, the robot system comprising:
   a first robot adapted to be positioned in proximity of a fuselage of an aircraft or spacecraft and comprising:
      a base portion;
      a movable robot arm connected at one end to the base portion and having at an opposite end a first coupling portion; and
      a first control means adapted to control the robot arm; and
   a plurality of second robots, each being smaller than the first robot and comprising:
      movement means allowing the respective second robot to be supported on a ground surface and allowing translational movement of the second robot along the ground surface and rotary motion about an axis perpendicular to the ground surface;
      a drive portion operable to drive the movement means to effect at least the translational movement of the respective second robot;

a tool portion comprising a tool adapted to carry out a specific operation of the plurality of operations;

a second coupling portion adapted to be selectively and releasably coupled with the first coupling portion in a predetermined positional relationship; and a second control means adapted to control the respective second robot, wherein for each operation of the plurality of operations, the plurality of second robots includes at least one second robot, the tool of the at least one second robot is adapted to carry out the respective operation, and wherein the first and second control means are adapted to control the drive portion of one of the second robots and the robot arm to couple the first coupling portion and the respective second coupling portion in the predetermined positional relationship, subsequently the robot arm to move the tool portion together with the second robot held by the robot arm to a selected location at which the specific operation, for which the tool portion of the respective second robot is adapted, is to be carried out, and then the second robot to carry out the specific operation at the selected location.

2. The robot system according to claim 1, wherein the first control means is further adapted to control the first coupling portion.

3. The robot system according to claim 1, further comprising a master control unit operable to communicate with at least one of the first control means and the second control means via a wired or wireless communication connection and to provide control commands or programming instructions to the first control means and the second control means, respectively.

4. The robot system according to claim 1, wherein the first and second control means are configured such that upon coupling the first coupling portion with the second coupling portion of one of the second robots the first control means is interfaced with the respective second control means to establish a communication connection, and the second control means is configured to provide control commands or programming instructions for the control of the movement of the robot arm and stored in the second control means to the first control means via the communication connection.

5. The robot system according to claim 1, wherein the drive portion, the second coupling portion and the tool portion of each of the second robots are modular units which are selectively and independently replaceable.

6. The robot system according to claim 1, wherein each second robot further comprises three levels arranged one on top of the other, wherein the drive portion is located at the lowest of the three levels, the second coupling portion is located at the middle level of the three levels and the tool portion is located at the uppermost level of the three levels.

7. The robot system according to claim 6, wherein each of the three levels is defined by a base plate on which the drive portion, the second coupling portion and the tool portion, respectively, is mounted.

8. The robot system according to claim 1, wherein the tool of at least some of the second robots is a 3D printer, an analysis, measurement or observation tool, a transport tool, an inspection or repair tool, a heating device, a painting or coating device, or a fastening tool.

9. The robot system according to claim 1, wherein the first coupling portion comprises an elongate straight coupling element having a first longitudinal axis and extending from the robot arm such that the coupling element is selectively movable by the robot arm in a first direction along the first longitudinal axis and at least into a second direction perpendicular to the first longitudinal axis and being the upward vertical direction when the first longitudinal axis is oriented horizontally, wherein the coupling element comprises:

a first abutment surface extending along the first longitudinal axis;

at least one second abutment surface facing away from the robot arm;

two spaced third abutment surfaces facing in the second direction and being located on opposite sides of the coupling element with respect to the first longitudinal axis; and a first locking means, and the second coupling portion comprises:

two spaced first boundary surfaces facing and opposing each other in a first plane oriented horizontally when the respective second robot is supported on a horizontal ground surface, and defining between them a first insertion space dimensioned such that the coupling element is at least partially insertible into the first insertion space through an opening between two ends of the first boundary surfaces by moving the coupling element in the first plane along the longitudinal axis of the coupling element, wherein the first insertion space comprises a first section extending from the opening and a second section separated from the opening by the first section, wherein the first section tapers from the opening towards the second section, two second boundary surfaces arranged at an angle with respect to each other and facing at least the second section of the first insertion space such that the two second boundary surfaces define upwardly of the first insertion space a tapering second insertion space, into which the coupling element is at least partially insertible by moving the coupling element, after the coupling element has been inserted at least partially into the second section of the first insertion space, in the second direction perpendicular to the first plane, wherein the second insertion space tapers upwardly towards an elongate straight transition region between the two second abutment surfaces, the transition region having a second longitudinal axis and a fourth abutment surface extending along the second longitudinal axis and facing the first insertion space in a direction perpendicular to the first plane, wherein the fourth abutment surface is configured to be contacted by the first abutment surface, when the first and second longitudinal axes are parallel to each other and the coupling element is in a topmost position within the second insertion space, and to then support the coupling element against movement in the second direction and in a direction perpendicular to the first and second directions, at least one fifth abutment surface arranged and configured to be contacted by the at least one second abutment surface to limit movement of the coupling element along the second longitudinal axis in a direction away from the robot arm, two spaced sixth abutment surfaces arranged and configured to be contacted by the two third abutment surfaces when the first abutment surface contacts the fourth abutment surface to then prevent rotational movement of the second coupling portion about the second longitudinal axis, and a second locking means adapted to be selectively engageable with the first locking means when the first abutment surface contacts the fourth abutment surface, the at least one second abutment surface contacts the at least one fifth abutment surface and the two third abutment surfaces contact the two sixth abutment surfaces, wherein when the first and second locking means are engaged movement of the coupling element along the second longitudinal axis in a direction towards the robot arm is prevented.

10. The robot system according to claim 9, wherein the coupling element comprises two projections extending from opposite sides of the coupling element with respect to the first longitudinal axis, wherein each projection has a first straight edge defining one of the second abutment surfaces or a second straight edge defining one of the third abutment surfaces, or the second section of the first insertion space is an elongate channel portion of constant width between parallel portions of the first boundary surfaces, or the second boundary surfaces are surface portions of at least one boundary element defining the at least fifth abutment surface, or the two sixth abutment surfaces are portions of a surface of a plate element.

11. The robot system according to claim 10, wherein the angular orientation of the third abutment surfaces is adjustable.

12. The robot system according to claim 9, wherein the angular orientation of the third abutment surfaces is adjustable.

13. The robot system according to claim 1, wherein the second control means is adapted to receive a control command instructing the respective second robot to move to a location within the range of movement of the robot arm.

14. The robot system according to claim 13, wherein each of the second robots comprises a sensor arrangement coupled to the respective second control means and operable to sense a predetermined object, wherein the second control means is adapted to stop movement of the second robot to the location within the range of movement of the robot arm upon detecting the predetermined object.

15. The robot system according to claim 14, wherein the sensor arrangement is a distance sensor arrangement adapted to sense a distance between the distance sensor arrangement and the predetermined object, wherein the second control means is adapted to stop movement of the second robot to the location within the range of movement of the robot arm upon detecting the predetermined object at a predetermined distance.

16. The robot system according to claim 1, wherein the second control means of the second robots are further adapted to control the respective second coupling portion.

17. The robot system according to claim 2, wherein the second control means of the second robots are further adapted to control the respective second coupling portion.

18. A method of operating a robot system, the robot system comprising:

a first robot adapted to be positioned in proximity of a fuselage of an aircraft or spacecraft and comprising:
a base portion;
a movable robot arm connected at one end to the base portion and having at an opposite end a first coupling portion; and a first control means adapted to control the robot arm; and a plurality of second robots, each being smaller than the first robot and comprising:
movement means allowing the respective second robot to be supported on a ground surface and allowing translational movement of the second robot along the ground surface and rotary motion about an axis perpendicular to the ground surface;
a drive portion operable to drive the movement means to effect at least the translational movement of the respective second robot;
a tool portion comprising a tool adapted to carry out a specific operation of the plurality of operations;
a second coupling portion adapted to be selectively and releasably coupled with the first coupling portion in a predetermined positional relationship; and
a second control means adapted to control the respective second robot, wherein for each operation of the plurality of operations the plurality of second robots includes at least one second robot the tool of which is adapted to carry out the respective operation, and wherein the first and second control means are adapted to control
the drive portion of one of the second robots and the robot arm to couple the first coupling portion and the respective second coupling portion in the predetermined positional relationship,
subsequently the robot arm to move the tool portion together with the second robot held by the robot arm to a selected location at which the specific operation, for which the tool portion of the respective second robot is adapted, is to be carried out, and
then the second robot to carry out the specific operation at the selected location, at least one third robot of identical construction as the first robot and located in a remote storage region, in which a plurality items are stored in compartments of a storage rack, the plurality of second robots comprises at least one second robot of a first category adapted to carry out a specific operation involving a modification of the aircraft or spacecraft, at least one second robot of a second category adapted to carry out a specific operation involving observing, measuring or analyzing the result of the specific operation carried out by one of the second robots of the first category, and at least one second robot of a third category adapted to carry out a specific operation involving transporting a specific type of item for use by a technician to rework or correct the result of the specific operation carried out by one of the second robot of the first category and observed, measured or analyzed by one of the second robots of the second category, wherein the method comprises:
a) positioning the first robot in proximity of a fuselage of an aircraft or spacecraft in a working environment, such that the tool of each second robot is able to reach a portion of the fuselage when held by the robot arm;
b) operating the first robot and one of the second robots of the first category to couple the second robot to the robot arm, to carry out the respective specific operation involving a modification of the aircraft or spacecraft, and to subsequently decouple the second robot from the robot arm, c) operating the first robot and one of the second robots of the second category to couple the second robot to the robot arm, to carry out the respective specific operation involving observing, measuring or analyzing the result of the specific operation carried out by the second robot of the first category in step a),
d) analyzing the result of the observation, measurement or analysis carried out by the second robot of the second category in step b) to determine whether one of the items is needed by a technician to rework or correct the result of the specific operation carried out by the second robot of the first category in step a), and, when one of the items is needed, operating, on the basis of the analysis of the results, one of the at least one third robot and one of the second robots of the third category to couple the second robot to the robot arm of the third robot, lift the second robot with the robot arm to the determined item, operate the second robot to move the item onto the tool of the second robot, and decouple the first and second robots, or move the determined item with the robot arm onto the tool of the second robot, and transport the determined item by the second robot to a technician in the working environment.

* * * * *